US011691408B2

(12) United States Patent
Slegers et al.

(10) Patent No.: US 11,691,408 B2
(45) Date of Patent: Jul. 4, 2023

(54) SYSTEM AND METHOD FOR DESIGNING AND CREATING A PRINTING PLATE

(71) Applicant: ESKO Software BVBA, Ghent (BE)

(72) Inventors: Kristiaan Slegers, Sint-Amands (BE); Franky Bru, Eeklo (BE); Kristiaan K. A. Van Bael, Sint-Laureins (BE)

(73) Assignee: Esko Software BV, Ghent (BE)

( * ) Notice: Subject to any disclaimer, the term of this patent is extended or adjusted under 35 U.S.C. 154(b) by 330 days.

(21) Appl. No.: 17/098,939

(22) Filed: Nov. 16, 2020

(65) Prior Publication Data
US 2021/0370662 A1 Dec. 2, 2021

Related U.S. Application Data

(60) Provisional application No. 63/029,978, filed on May 26, 2020.

(51) Int. Cl.
*B41C 1/18* (2006.01)
*B41N 1/16* (2006.01)
(Continued)

(52) U.S. Cl.
CPC ............. *B41C 1/184* (2013.01); *B41C 1/18* (2013.01); *B41N 1/16* (2013.01)

(58) Field of Classification Search
CPC .............. B41C 1/184; B41C 1/18; B41N 1/16
See application file for complete search history.

(56) References Cited

U.S. PATENT DOCUMENTS 4,828,641 A 5/1989 Werther et al.
6,945,169 B2 9/2005 Gottling et al.
(Continued)

FOREIGN PATENT DOCUMENTS

EP 0286020 A2 10/1988
EP 1367812 A2 12/2003
(Continued)

OTHER PUBLICATIONS

International Search Report and Written Opinion for International Application No. PCT/EP2020/083849, dated Mar. 9, 2021, 11 pages.
(Continued)

*Primary Examiner* — Yaovi M Ameh
*Assistant Examiner* — Quang X Nguyen
(74) *Attorney, Agent, or Firm* — RatnerPrestia

(57) ABSTRACT

A method for designing a printing plate for mounting on a printing cylinder. An optimal lateral seam path is defined between opposite lateral edges of the plate by applying an energy minimization function. Top and bottom edges of the plate are defined based upon the optimal lateral seam path, preferably with a variable gap therebetween, and the bottom edge is unwrapped from the top edge to define a closed cutting path. The area inside the closed cutting path is wrapped with artwork or portions thereof, and an updated digital graphics file stored. The energy minimization function may include a penalty function, overall seam path length, and seam path amplitude, with weighting factors. For artwork including staggered lanes of step and repeat one-up images, the optimal lateral seam path may extend across each lane through one-up images, steps between adjacent one-up images, or a combination thereof.

30 Claims, 13 Drawing Sheets

(51) Int. Cl.
  *H04N 1/387* (2006.01)
  *B41M 1/04* (2006.01)

(56) References Cited

U.S. PATENT DOCUMENTS

| | | | |
|---|---|---|---|
| 7,033,450 | B2 | 4/2006 | Salvestro |
| 7,171,901 | B2 | 2/2007 | Salvestro |
| 8,477,380 | B2 | 7/2013 | Telem et al. |
| 8,578,851 | B2 | 11/2013 | Leloup et al. |
| 8,638,475 | B2 | 1/2014 | Dardikman et al. |
| 9,056,450 | B2 | 6/2015 | Kennair et al. |
| 9,375,916 | B2 | 6/2016 | Thomas et al. |
| 10,150,319 | B1 | 12/2018 | Bielak |
| 2004/0060647 | A1* | 4/2004 | Tabora ............... B41F 27/005 156/450 |
| 2004/0187721 | A1 | 9/2004 | Salvestro et al. |
| 2008/0041249 | A1* | 2/2008 | D'Hauwe ............ B41F 27/1281 428/909 |
| 2014/0326152 | A1* | 11/2014 | Gartner ............... B41F 27/1268 101/477 |
| 2016/0200129 | A1* | 7/2016 | Kanayama ........... H05K 3/1275 101/381 |
| 2019/0022998 | A1* | 1/2019 | Behnke ................ B41F 17/18 |
| 2019/0061338 | A1 | 2/2019 | Scheele et al. |

FOREIGN PATENT DOCUMENTS

| | | | |
|---|---|---|---|
| EP | 1543966 | A1 | 6/2005 |
| EP | 1824682 | A1 | 8/2007 |
| EP | 2120096 | A1 | 11/2009 |
| EP | 2225106 | A1 | 9/2010 |
| EP | 2397327 | A2 | 12/2011 |
| EP | 2560819 | A1 | 2/2013 |
| EP | 2868471 | A2 | 5/2015 |
| EP | 3263353 | A1 | 1/2018 |
| WO | 2018226409 | A1 | 12/2018 |
| WO | 2019038400 | A1 | 2/2019 |

OTHER PUBLICATIONS

Dijkstra, E.W., "A Note on Two Problems in Connexion with Graphs", Numerische Mathematik 1, 1959, pp. 269-271.

Hart et al., "A Formal Basis for the Heuristic Determination of Minimum Cost Paths", IEEE Transactions on Systems Science and Cybernetics, Jul. 1968, pp. 100-107.

Ho et al., "Smoothing Voronoi-based Obstacle-avoiding Path by Length-minimizing Composite Bezier Curve", 2009, accessible at https://www.iis.sinica.edu.tw/papers/liu/8846-F.pdf, 31 pages.

Kang et al., "Optimisation of Pipeline Route in the Presence of Obstacles Based on a Least Cost Path Algorithm and Laplacian Smoothing" International Journal of Naval Architecture and Ocean Engineering, 9, 2017, pp. 492-498.

International Preliminary Report on Patentability and Written Opinion for International Application No. PCT/EP2020/083849, dated Nov. 17, 2022, 7 pages.

\* cited by examiner

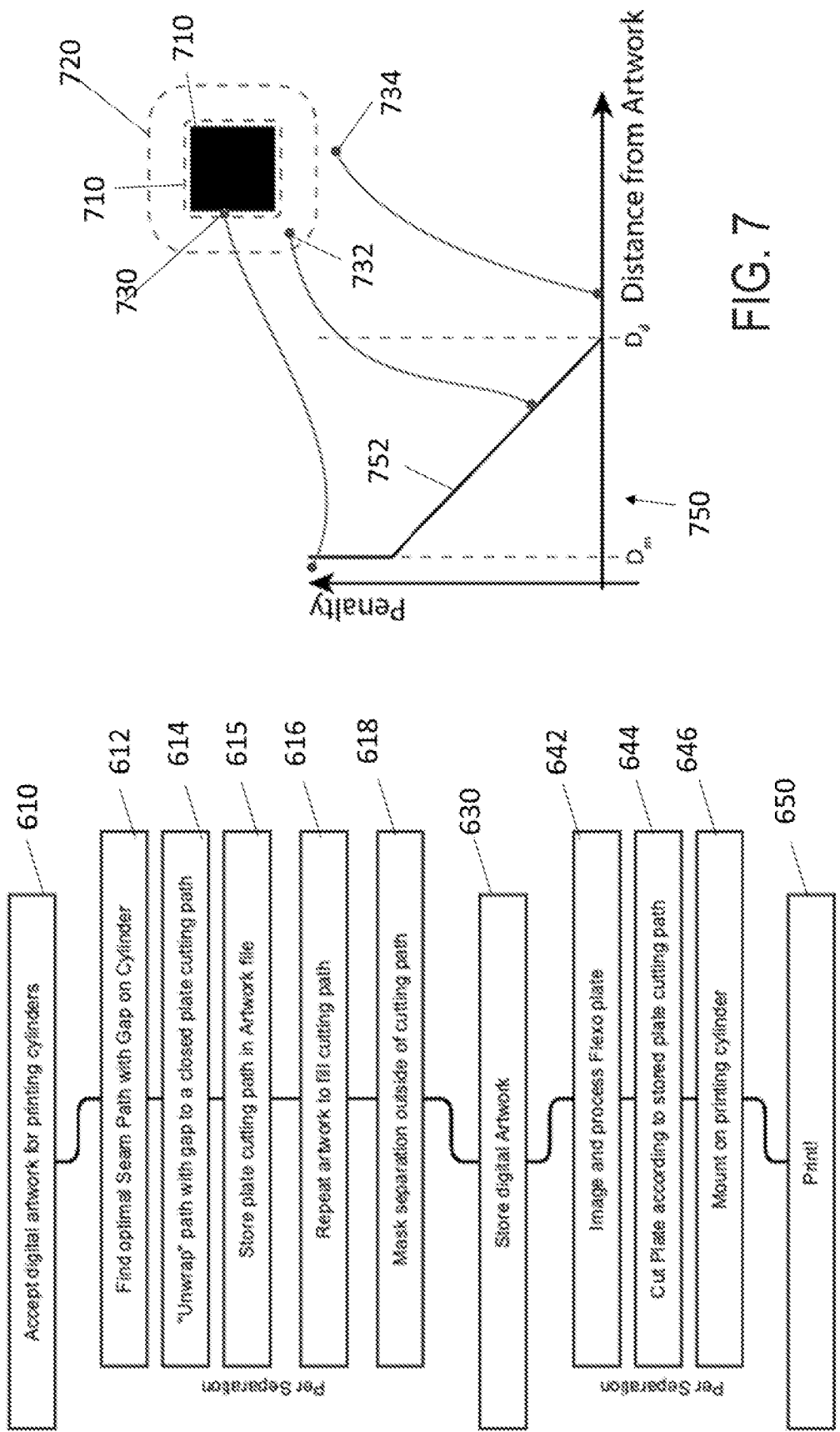

SYSTEM AND METHOD FOR DESIGNING AND CREATING A PRINTING PLATE

CROSS-REFERENCE TO RELATED APPLICATIONS

This application claims priority from U.S. Provisional Application Ser. No. 63/029,978, filed May 26, 2020, titled SYSTEM AND METHOD FOR DESIGNING AND CREATING A PRINTING PLATE, the contents of which are incorporated herein by reference.

BACKGROUND OF THE INVENTION

In flexographic printing on a continuous web, such as, for example, in the field of flexible packaging or label printing, the "one-up" (a single specimen of a full design to be printed), sometimes also referred to herein as a "station," is not as wide as the web. Accordingly, multiple copies of the same (or different) one-up are printed in a plurality of lanes alongside each other. An exemplary printing sleeve 120 on a printing cylinder 112 is depicted in FIG. 1A, having three lanes 114 of one-ups 116. If the one-ups in all of the lanes are all "in phase" as depicted in FIG. 1A, then the risk of mechanical vibrations will increase as the cylinder moves in the machine direction along arrow Y, which vibrations may have a negative effect on the printing quality. Therefore, it is more desirable to align the one-ups in a staggered fashion, with the one-ups in the plurality of lanes offset out of phase relative to one another on the printing cylinder.

When using a flexographic printing sleeve 120, such as depicted in FIGS. 1A and 1B, the staggered layout may be directly imaged as desired. Frequently, however, a planar flexographic printing plate 130 is used, such as is depicted in FIGS. 1C and 1D, having a lateral (or horizontal) width $C_W$ defined between lateral edges of the cylinder and a nominal length $C_C$ (or vertical height) defined between top and bottom edges 131, 132 and corresponding to the circumference of the cylinder. The term "vertical" as used herein references the machine direction Y, consistent with the illustrations. The artwork may be oriented in any direction, and use of the term "vertical" refers only to the machine direction, and not to any reference direction of the artwork itself. The printing plate vertical height/nominal length dimension L corresponds to the circumference of the printing cylinder 112. When the planar plate 130 is wrapped around the printing cylinder 112, abutting edges 131, 132 of the wrapped plate create a seam 134. It is technically undesirable to attempt to print inked content that extends on continuously across the seam. Therefore, a rectilinear straight seam, without one or more inflection points, is usually not an option with a staggered layout, meaning the plate needs to be imaged and cut in accordance with a non-rectilinear seam having one or more inflection points, such as seam 134.

Producing staggered cut flexo plates presents some challenges. Plates with non-rectangular top and bottom edges typically create relatively more waste of flexo plate material than plates having rectangular top and bottom edges. Determining optimal plate cutting paths is a time-consuming operation, even for a skilled operator. The risk of damaging the plate during cutting, mounting and unmounting typically increases with the complexity of the cutting paths.

A single print production run (in color) typically requires multiple flexo plates, one per printing color separation. To ensure printing in register, all of the separation plates must honor the same staggered layout, but that does not necessarily mean they all are cut in the same shape.

Near the sides of the cylinder, there is usually some room reserved for production marks for the purpose of (inline) quality/process control, or bearer bars (portions of plate material having a maximum height above the floor outside of the artwork to help spread printing pressure). Defining cutting paths must also take into account the position of the seam relative to these marks, to make sure they can still fulfill their intended function.

The most common practice historically has been for the seam to follow the edges/space between the one-ups as depicted in FIGS. 1C and 1D, in which case the plates for all printing separations can use the same cutting pattern. However, if one separation has enough white space 202 (areas between printable features 204, 206, which do not require ink transfer) in the design, then the seam 234 may travel through the one-up, as depicted for plate 200 in FIGS. 2A and 2B. Notably, each one-up 210 is shown with a defined boundary 212 that does not comprise printable content, but may, for example, represent a seam path along which the printed content will eventually be cut to form a single instance of the printed specimen, such as a label. The ability to create a seam through the one-up may enable use of a less complex plate shape which causes less material waste and may have other benefits as well. In the example for the separation depicted in FIGS. 2A and 2B, plate 200 has top and bottom edges that are relatively closer to rectilinear than a line extending only through gaps between adjacent one-ups, and the locations of these edges does not disturb printed quality.

Referring now to the flowchart of FIG. 3, an exemplary method 300 of producing plates with staggered content (in which one-ups in adjacent lanes are vertically offset from one another), comprises in step 310 digitally preparing the stagger pattern and the cutting paths for the outline of the plate for each separation and storing the prepared content in a step & repeat graphics file. In step 320, the step & repeat graphics file is processed (RIP'ed) by a raster image processor (RIP). In step 330, plate-merging software is typically used for determining an optimal way to lay out the plates for each separation on the available plate material. Some software, such as Digital Flexo Suite™ software from Esko Software BVBA, ignores ripped data outside of the plate cutting paths (if not already removed by a masking step), allowing for tighter nesting of the patches or plates when creating the plate material. The plate material is then imaged, as determined by the plate-merging software, and processed in step 340, and the processed plate material is then cut into the desired flexo plate(s) in step 350, typically using an automated cutting table, according to cut boundaries as defined. The cut plates are then mounted on the printing cylinder (or on an intermediate carrier), ready for printing, in step 360.

Current approaches for creating the plate layout on a cylinder may use an algorithm to automatically find a path between the one-ups, such as the seam path resulting in seam 134 in FIG. 1D. That path is then typically used for all separations. In other embodiments, an operator may use a manual tool, to draw/modify a seam path (which may be different for each printing separation), such as the seam path that results in seam 234 depicted in FIG. 2B. Thus, manual methods of achieving an optimal cut pattern still require a skilled operator and extra time, whereas the automated alternative yields more plate material waste. Accordingly, more efficiently providing plate designs that minimize plate material waste with minimal operator time remains an important goal.

Some prior methods, such as those described in U.S. Pat. No. 8,477,380 B2 relate to methods in which plate material is cut in an identified pattern, and then mounted on an imaging cylinder to be imaged. Other methods, such as are implemented in in products such as Esko® Plato™, image the plate first, and then cut the plate into the cut shape.

While the approach for determining the seam line set forth in U.S. Pat. No. 8,477,380 indicates that the seam cut line may be created inside the image elements in areas that will not be imaged and adheres to a minimal acceptable distance between the seam cut line and the imageable areas, the approach optimizes the seam cut line by minimizing the length of the seam cut line. Seeking to minimize the length of the line only, however, may not provide a seam line that is optimal overall. In fact, in some instances, using a minimum distance from the artwork and a minimum length of the cutting path as the only criteria for optimization may not yield a solution at all. In other instances, although the line conforms remains outside the minimum distance from the artwork, that minimum distance may still be unnecessarily close to the artwork.

Selecting a cutting path that extends through the artwork ideally takes into account not only the increased risk that a cut through artwork may be visible in the printed result, but other risks as well. For example, artwork that is very close to the cut edge is more likely to be damaged during cutting, mounting or unmounting, and thus it may be more desirable to place the seam path further away than the minimum distance from the artwork in a least some portions of the design. It may also be important to avoid the cutting path having unnecessarily sharp corners, because sharp corners are difficult to cut, and present weak spots where the plate can tear during unmounting. Furthermore, some operators prefer to have a gap at the seam to make it easier to insert a tool for unmounting the plate from the cylinder. Finally, it may be desirable for the seam to avoid interfering with the intended function of production marks or bearer bars.

While software exists that helps to prepare the cylinder layout with a staggered design, as well as the plate cutting paths for the separations (e.g. Esko® Plato™, the existing automatic algorithms may not yield the most optimal cutting paths, and manual workflows are very time consuming and require an experienced operator.

SUMMARY OF THE INVENTION

One aspect of the invention includes a method for designing a printing plate having a plate width defined between lateral edges and a nominal plate length defined between top and bottom edges. The printing plate is configured for mounting on a printing cylinder having a cylinder width and a cylinder circumference, in which the nominal plate length dimension corresponds to cylinder circumference. The method comprises the steps of (a) preparing an initial digital graphic file comprising artwork; (b) defining an optimal lateral seam path between the opposite lateral edges of the printing plate by applying a minimal energy-path finding algorithm, such as an energy minimization function; (c) defining a top edge and bottom edge of the plate; and (d) unwrapping the bottom edge from the top edge to define a closed cutting path including the top edge, the bottom edge, and opposite side edges connecting the top and bottom edges of the plate. The area defined by the closed cutting path is then wrapped with artwork or portions thereof; and an updated digital graphics file is stored. Artwork outside of the closed cutting path may be removed in a masking step before saving the updated file.

The top edge and bottom edge may be defined to encompass a gap having a gap width equal to or lesser than a maximum gap width on opposite sides of at least portions the optimal lateral seam path. The gap may have a variable gap width along the length of the optimal lateral seam path, meaning that the top and bottom edges may be non-identical in geometry. The method may comprise smoothening the optimal lateral seam path and/or the top and bottom edges to minimize a number of inflection points and maximize radius of the inflection points.

The artwork may comprise a plurality of production marks and one or more lanes of one-up images or portions thereof are arranged in a step and repeat pattern along the length of the printing plate, with the one or more lanes distributed across the width of the plate. Each one-up image has a top boundary, a bottom boundary, and opposite lateral edges, and each pair of adjacent one-up images in a same lane has a step between each bottom boundary of a first one-up image and an adjacent top boundary of a second one-up image. In such embodiments, the optimal lateral seam path is defined to travel across each lane through one or more one-up images, steps between adjacent one-up images, or a combination thereof. In embodiments with at least two lanes, the top boundary of a complete topmost one-up image in a first lane is offset from the top boundary of a corresponding complete topmost one-up image in a second lane.

The energy minimization function may include a proximity metric and one or more curve metrics, such as for example, an energy minimization function comprising a proximity penalty function P integrated along the seam path, such as a penalty function configured to assign a highest penalty to proximity within a printed feature of the artwork or within a minimum distance from the printed feature of the artwork, assign a lowest penalty beyond a desired distance from the printed feature greater than the minimum distance, and assign a variable penalty in a range lying between the minimum distance and the desired distance. In embodiments in which the artwork comprises a die line and a bleed area, the penalty function may be configured to assign a relatively greater penalty to printed features within the die line than within the bleed area. The proximity penalty function further includes one or more centerline corridors corresponding to a centerline between die lines, wherein the penalty assigned to the centerline corridor is relatively lower than a penalty that would be assigned based on proximity to the bleed area. The energy minimization function may include minimizing overall seam path length and/or minimizing seam path amplitude as an optimization criterion, and may include weighting factors for weighting the penalty function, the overall seam path length, and seam path amplitude. The penalty function may be a pixelized penalty function.

The steps as described for determining the optimum lateral seam path and closed plate seam path may be performed for each of a plurality of separations corresponding to the digital graphic file. The step of defining the optimal lateral seam path comprises defining a plurality of potential lateral seam paths conforming to the seam path criteria within a predetermined degree of deviation, providing a visual display illustrating the plurality of potential lateral seam paths, and receiving a user-input selecting one of the plurality of potential lateral seam paths as the optimal lateral seam path.

A first initial digital graphic file may be provided with a first stagger distance between complete one-ups in adjacent lanes, the method steps performed to define the optimal lateral seam path corresponding to the first stagger distance, and then the method steps performed again for a second stagger distance different than the first stagger distance to define a second optimal lateral seam path corresponding to the second stagger distance. The remaining steps of the method may be performed using a selected one of the first or second stagger distance.

Another aspect of the invention comprises a process for creating a printing plate, comprising the steps of designing the printing plate in accordance with a method as described herein, imaging the printing plate in accordance with the updated graphics file; exposing and processing the printing plate; and cutting the printing plate in accordance with the closed cutting path. The process is preferably performed sequentially in which the imaging, exposing, and processing steps are performed before cutting the printing plate. The imaging step may be performed after merging more than one printing plate onto a merged intermediate plate, in which case the merged plate is cut in accordance with the respective closed cutting paths of each of the respective more than one printing plates.

Still another aspect of the invention comprises a method of printing with a printing plate created by the process as described herein, further comprising the steps of disposing the printing plate on a printing cylinder such that the top edge and the bottom edge of the plate lie adjacent one another, with the gap as described herein between at least the respective portions thereof, and printing the artwork on a substrate. The method may further comprise the step of removing the printing plate from the printing cylinder using a tool inserted in the gap.

Yet another aspect of the invention comprises a printing plate product made by a process as described herein. Such printing plates may have a top edge with a first path geometry and a bottom edge with a second path geometry, in which the first path geometry and the second path geometry are not identical. When disposed wrapped around a cylinder, the top edge and the bottom edge of the printing plate may lie adjacent one another within a distance ranging from zero to a predefined maximum from one another as defined by the gap.

Still another aspect of the invention comprises computer readable media embodying non-transitory computer-readable instructions that when executed by a processor cause the processor to perform a method or any portion thereof as described herein. Another aspect of the invention comprises a printing system including a processor and the computer readable media as described. The printing system may further comprise an imager configured to receive instructions from the processor for imaging the printing plate in accordance with the updated graphics file and a cutter configured to receive instructions from the processor for cutting the printing plate in accordance with the closed cutting path.

BRIEF DESCRIPTION OF THE DRAWINGS

FIG. 6 is a flowchart schematically depicting an exemplary process for creating printing plates in accordance with one aspect of the invention.

FIG. 7 is an illustration depicting a graph for applying one aspect of a penalty function.

DETAILED DESCRIPTION OF THE INVENTION

One aspect of the invention is an overall process 600 for manufacturing a printing plate, as depicted by the flowchart of FIG. 6. In step 610, digital artwork is received for the printing cylinder, having an initial layout. In step 612, the optimal seam path with a gap is defined (such as described herein), the path and gap are unwrapped into a closed plate-cutting path in step 614, and the path is stored in the artwork file in step 615. The artwork is repeated to fill the region inside the cutting path in step 616, and a mask is applied in step 618 to remove anything outside the boundary of the cutting path. Steps 612-618 are repeated for each separation, and the digital artwork is stored in step 630. In step 642, the flexo plate is imaged and processed (e.g. exposed such as with UV light and uncured polymer removed); in step 644, the plate is cut in accordance with the stored cutting path; and in step 646, the plate is mounted on the printing cylinder. Steps 642-646 are repeated for each separation. Then, in step 650, printing commences. In the imaging and processing step, a plurality of printing plates may be merged onto a larger merged intermediate plate, in which case after imaging and processing, the merged intermediate plate is cut in accordance with the respective closed plate cutting paths of the plurality of printing plates.

An exemplary process for creating a printing plate may include designing a printing plate in accordance with the method as described herein, forming a printing plate corresponding to the updated digital graphic file by imaging, exposing, and otherwise processing the printing plate, cutting the printing plate along the closed cutting path geometry to define a top cut edge and a bottom cut edge of the plate, and wrapping the plate around the printing cylinder such that the top cut edge and the bottom cut edge and the gap between them forms a seam.

The methods as described herein are preferably performed by a computer processor programmed with non-transitory machine-readable instructions for causing the processor to execute the method steps as described herein.

Figure 11:
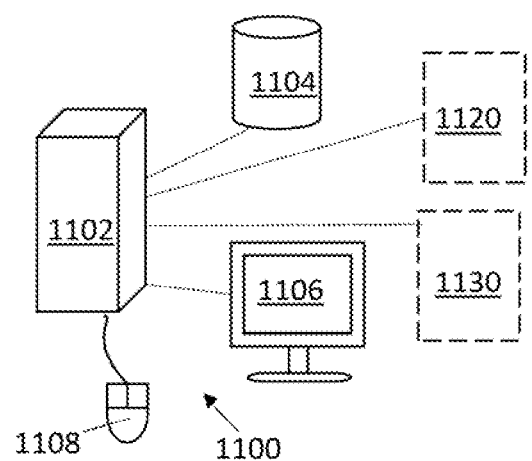
FIG. 11 is an illustration of an exemplary system according to one aspect of the present invention.

As depicted in FIG. 11, an exemplary system 1100 for performing the invention includes processor 1102 with access to computer memory media 1104 containing non-transitory machine-readable instructions stored on the media. The computer memory media may comprise any type of computer memory media known in the art or yet to be widely implemented, including but magnetic, optical, flash memory, and the like, and may include portable media, media co-located with one or more associated processors such as in a desktop or laptop computer or mobile device, and media on a server or otherwise accessible via a network, such as via the Internet, without limitation. The system may also include a display device 1106 configured to present visual information to a human user, and a user interface for receiving input such as instructions from the human user. The user interface may include a visual image rendered on the display device 1106 as part of a graphical user interface (GUI), and any type of user input device 1108 known in the art. Suitable user input devices include, for example, a mouse, trackball or other cursor control and selection device, a keypad for entering alphanumeric instructions, and/or a touchscreen for permitting the user to manipulate the image on the display device. A touchscreen implementation may be configured to permit a user to drawing graphical images or otherwise manipulate the screen using a stylus or finger or multiple fingers, to select radio buttons or items from a menu, such as a dropdown menu, or to select alphanumeric characters on a virtual keyboard. The display/user interface may comprise a mobile device connected to the processor via a wired or wireless network. The processor (which may comprise multiple processors in multiple locations in communication with one another), may reside locally, remotely on a network (including via the Internet), or in part on a mobile device. The invention is not limited to any particular computer system, computer processor, type of display, type of memory or user input device for carrying out the invention.

System 1100 may further be integrated with other components of the workflow for creating a printing plate, including but not limited to imagers 1120 and cutting machines 1130, which may receive instructions specific to the plate design as created using the system. The processor may be part of an integrated system that also controls other aspects of the platemaking workflow, including exposure units (which in some embodiments may also receive imagewise information specific to printing or non-printing features on the plate), plate washing (or other plate processing equipment), and lithographic printing systems for applying ink to a web of sheet material using printing plates created in accordance with aspects of the invention. Although described herein with respect to an imaged plate using LAM and UV exposure technology, it should be understood that the invention is not limited to any particular method of platemaking, and may include, for example other masking technologies as well as additive manufacturing, without limitation.

With reference to FIGS. 4A-4F and FIG. 5, a more detailed exemplary method 500, such as performed by a computer processor in the system as depicted in FIG. 11, will now be generally described in accordance with one aspect of the invention. As depicted in FIGS. 4A-4F, an exemplary digital graphic file corresponding to graphics layout 400 has three lanes 402a, 402b, 402c distributed across the width of the plate, each lane defining a plurality of one-up images 404 (404a, 404b, 404c, etc.) or portions thereof arranged in a step and repeat pattern along the length of the printing plate. Each one-up image has a top boundary 405, a bottom boundary 406, and opposite lateral edges 407, 408. Each pair of adjacent one-up images (e.g. 404a, 404b) in a same lane (e.g. 402a) has a step 410 between each bottom boundary of a first one-up image 404a and an adjacent top boundary of a second one-up image 404b. The top boundary of the complete topmost one-up image 404b in lane 402a is offset by distance Y from the top boundary of the corresponding complete topmost one-up image 404e in lane 402b, referred to herein as the "stagger distance".

Figure 1A:
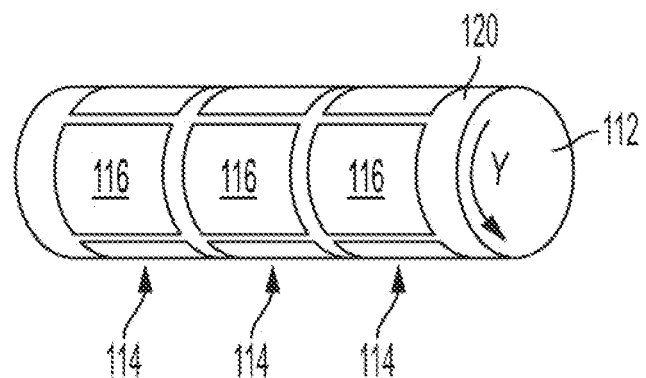
FIG. 1A is a perspective view illustration depicting an exemplary prior art printing sleeve mounted on a cylinder, with a plurality of one-up images in adjacent lanes aligned in phase.
Figure 1B:
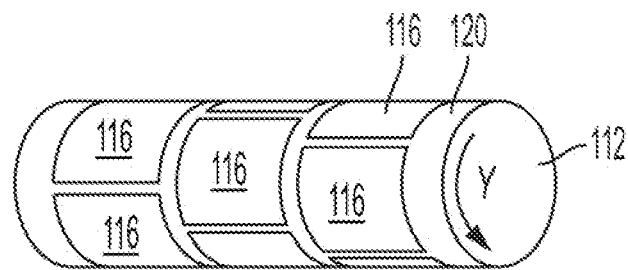
FIG. 1B is a perspective view illustration depicting an exemplary prior art printing sleeve mounted on a cylinder, with a plurality of one-up images in adjacent lanes offset from one another out of phase.
Figure 1C:
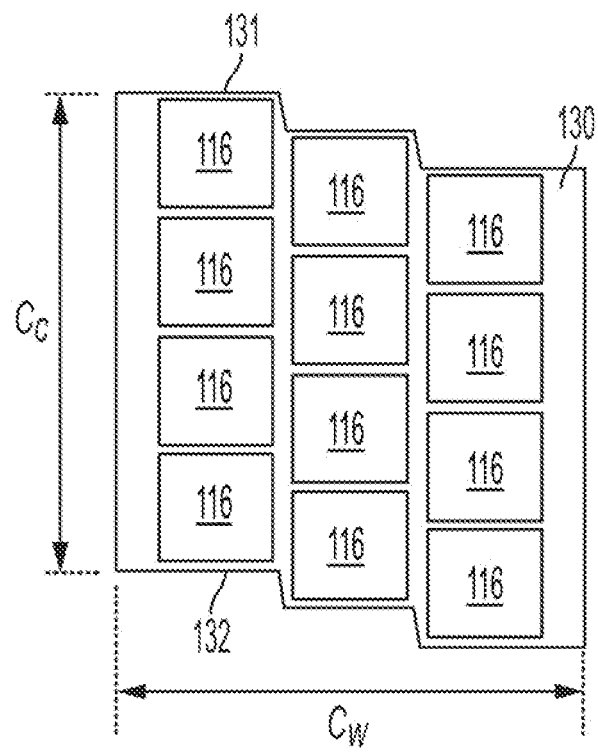
FIG. 1C is a plan view illustration of a planar printing plate having the same arrangement of one-up images as FIG. 1B, configured to be wrapped around a cylinder, having top and bottom edges with one or more inflection points but that extend only through gaps between adjacent one-up images.
Figure 1D:
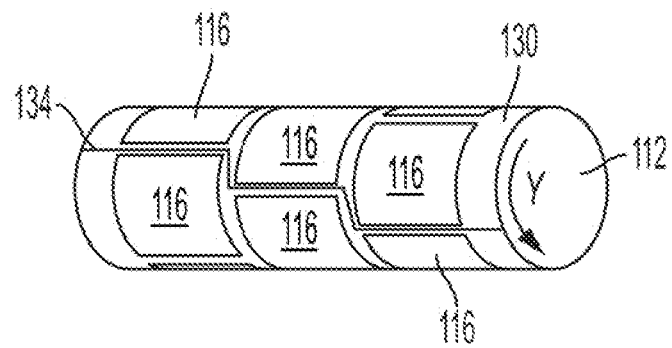
FIG. 1D is a perspective view illustration depicting the printing plate of FIG. 1C, showing the seam where top and bottom edges of the plate abut one another when the plate is wrapped around the printing cylinder.
Figure 2A:
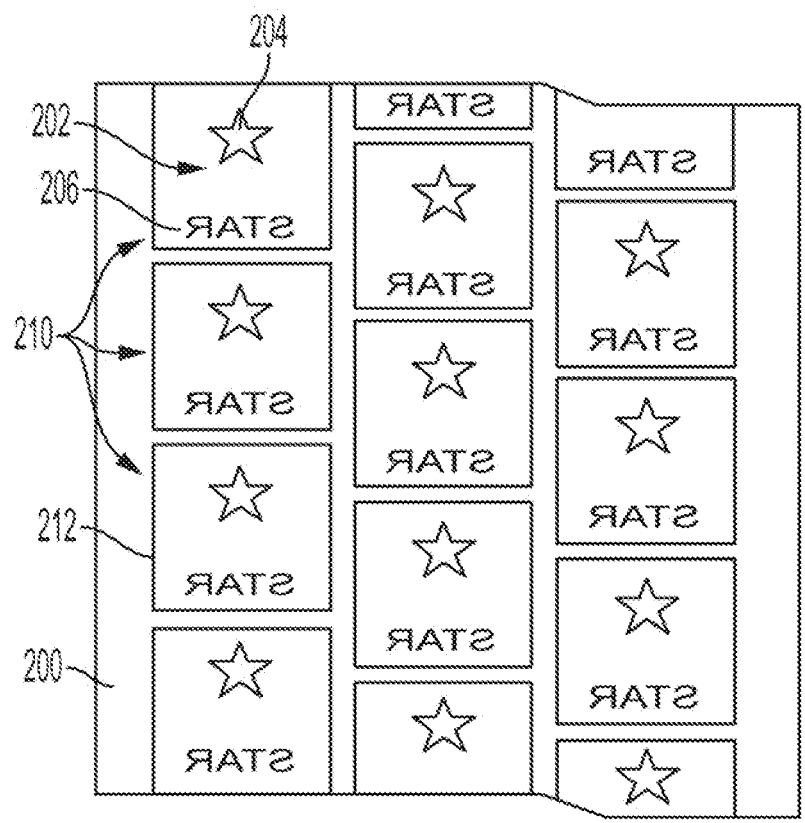
FIG. 2A is a plan view illustration of a planar printing plate configured to be wrapped around a cylinder, wherein the one-up images have white space between graphic features in the images, and the top and bottom edges have one or more inflection points and bisect white space within the boundaries of the one-up images.
Figure 2B:
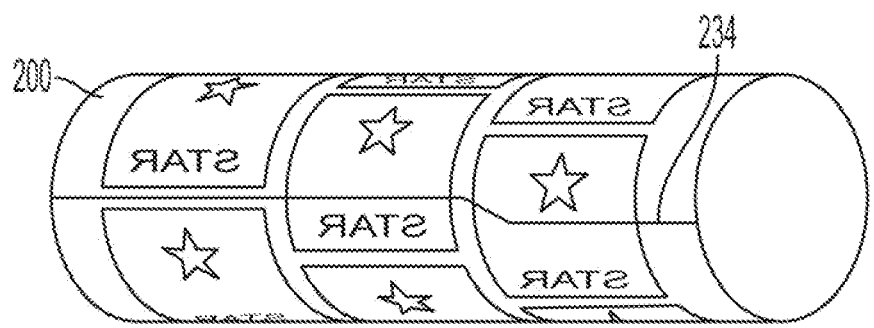
FIG. 2B is a perspective view illustration depicting the printing plate of FIG. 2A, showing the seam where top and bottom edges of the plate abut one another when the plate is wrapped around the printing cylinder.
Figure 3:
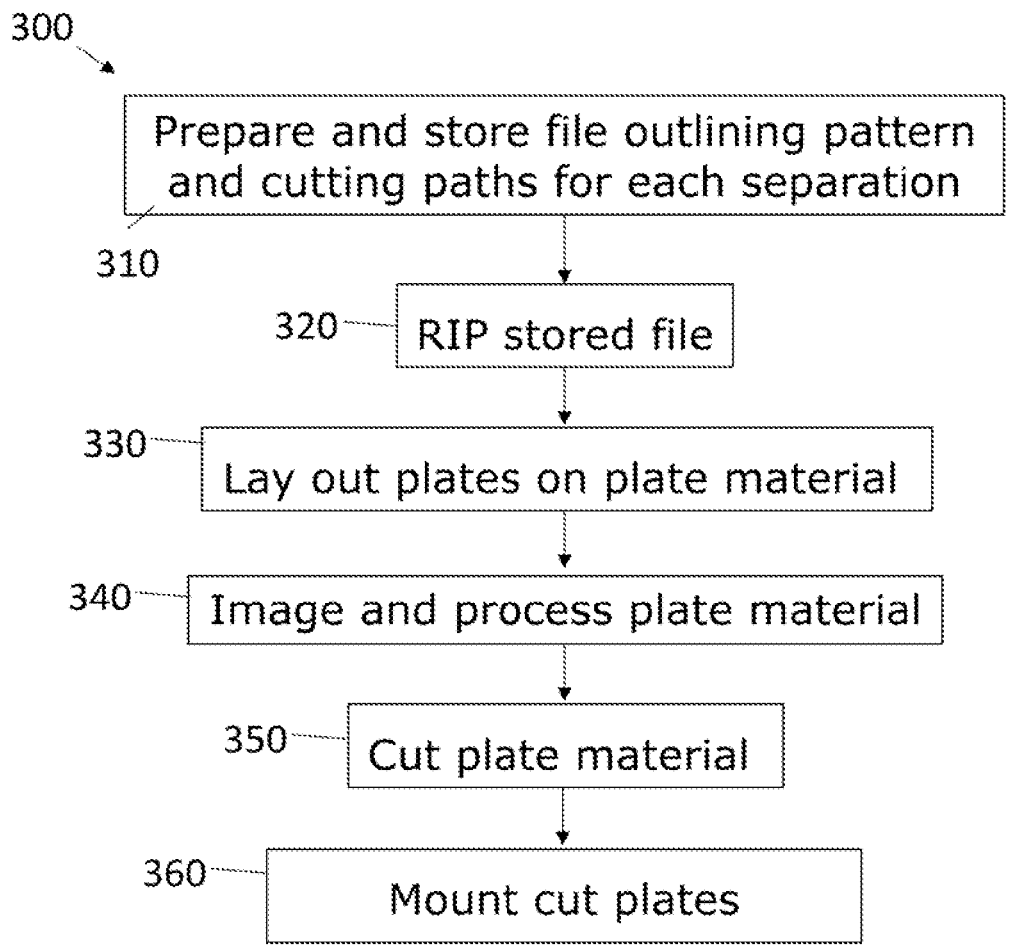
FIG. 3 is a flowchart schematically depicting an exemplary prior art method for creating printing plates with offset lanes.
Figure 4A:
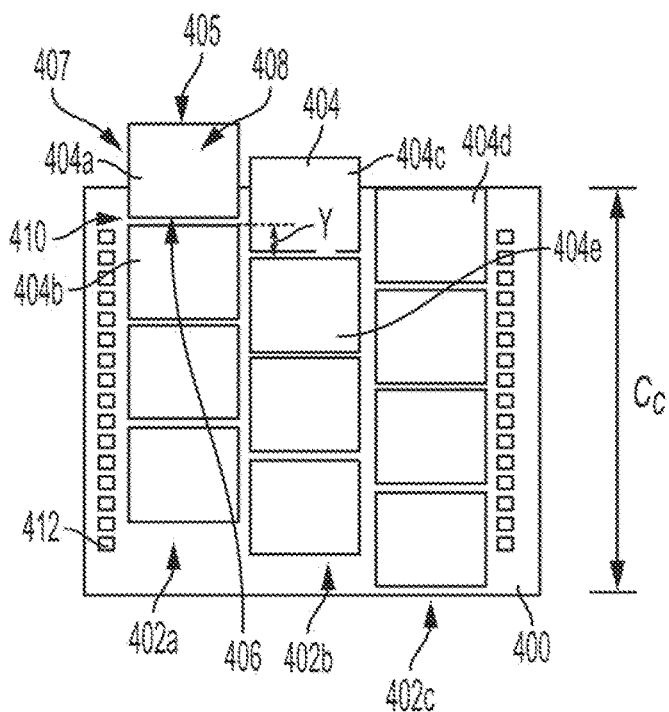
FIG. 4A is an exemplary staggered layout showing positioning of one-ups and production marks.

According to one embodiment of the method, an operator first specifies a desired staggered layout, such as the staggered layout depicted on plate 400 as shown in FIG. 4A, including the position of one-ups 404 and production marks 412. Although represented in FIGS. 4A-4F as rectangles, production marks 412 typically comprise more complex artwork. The initial staggered layout represents one possible way how the plates may be cut, including specifying the dimensions of the step between adjacent one-up images, but not necessarily the final shape of the plate. The algorithm repeats (wraps) the artwork along the cylinder circumference to simulate the intended seamless printed result in step 510, as represented by the lighter shaded regions 404, 413 in FIG. 4B.

Figure 4B:
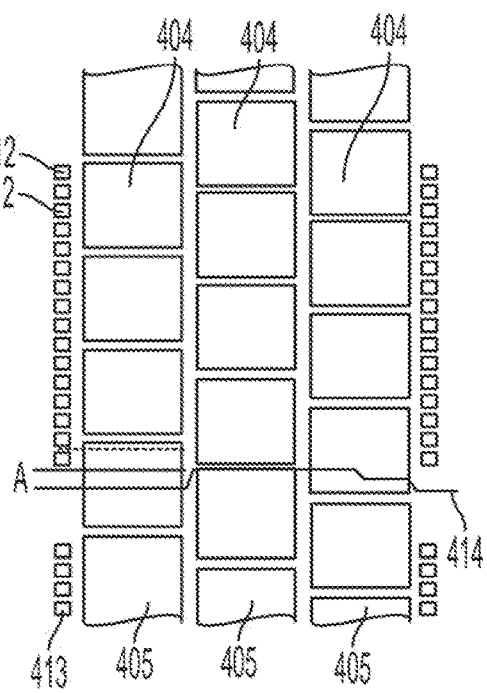
FIG. 4B is an exemplary staggered layout showing an exemplary cutting path for the top and bottom edges of a defined plate for a specific separation wherein the edges have one or more inflection points.

Then, for each printing separation, in step 520, the processor defines an optimal seam path that connects the left and right side of the cylinder (step 612 in FIG. 6). This optimal seam path may extend between one-ups, through them, or a combination thereof, such as cutting path 414, such as depicted in FIG. 4B. The optimal cutting path preferably avoids inked areas by a sufficient distance and has a minimal amplitude A. In some embodiments, a RIP process may be simulated to identify the inked areas that designate some amount of ink-transfer and in other embodiments, the optimal seam path may be identified from a vector image. The optimal path travels from one vertical edge to the opposing vertical edge of the plate, traveling only through non-inked areas (or optionally, through a bleed line, preferably through the centerline of adjacent die lines). The algorithm may include programming to avoid inked areas by a given distance and to minimize vertical amplitude of the path, with an ideal path being a straight rectilinear (horizontal) line without inflections. Although not limited to any particular distances, an exemplary given minimum safe distance from inked content is typically in a range between 0.2 mm and 0.5 mm, with a preferred given distance to inked areas often being about 10 times larger: in a range between 2 mm and 5 mm.

Figure 4C:
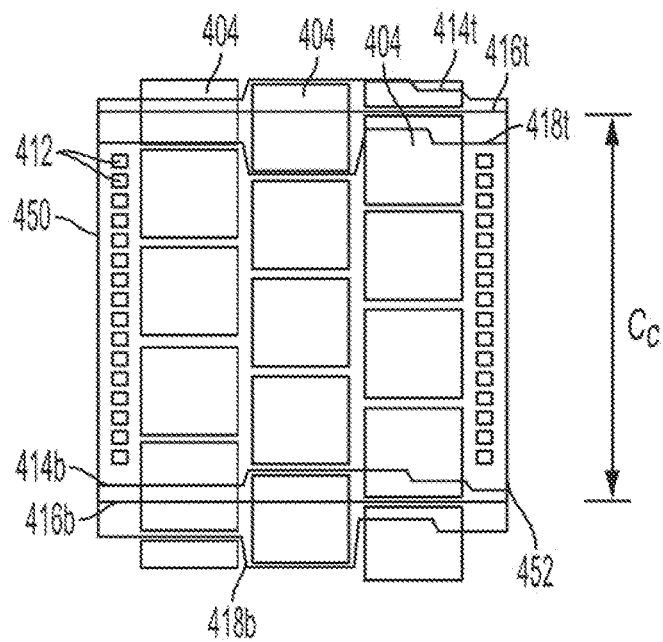
FIG. 4C is an exemplary staggered layout showing an exemplary cutting path for the top and bottom edges of defined plates for a plurality of separations.

In step 530, a gap is added to the cutting path, with possibly a variable width. This gap is depicted, for example, by upper 902 and lower 906 lines bounding seam 904 in FIG. 9B. This seam and gap is then converted to a closed plate cutting path, by first smoothening the seam path (and/or top and bottom edges) in step 540, and then vertically offsetting the top and bottom edges of the gap by the cylinder circumference in unwrapping step 550 (step 614 in FIG. 6), The foregoing steps are repeated for every separation, resulting in respective top and bottom cutting paths 414$t$ and 414$b$, 416$t$ and 414$b$, and 418$t$ and 418$b$ corresponding to each flexo plate separation, as depicted in FIG. 4C. If not already completed, the step & repeat graphic file is then updated to ensure all artwork, including partial one-ups, is present between the upper and lower cutting paths for each separation, and the artwork outside the closed plate cutting path is removed (step 618 in FIG. 6). This masking is performed for each separation independently. The digital file is updated accordingly (step 630 in FIG. 6). In systems configured to ignore data outside the plate cutting path, the masking step may not be necessary.

Figure 4D:
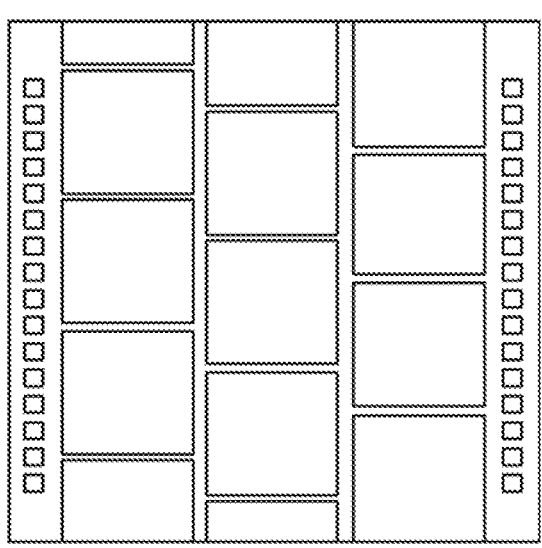
FIG. 4D is an outline of a first separation having the top and bottom edges as defined by one of the cutting paths in FIG. 4C, resulting in a rectilinear shape.
Figure 4E:
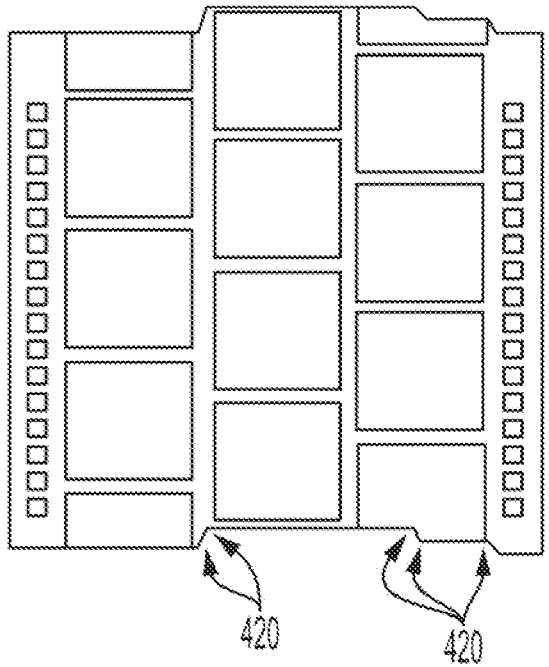
FIG. 4E is an outline of a second separation having the top and bottom edges as defined by one of the cutting paths in FIG. 4C.
Figure 4F:
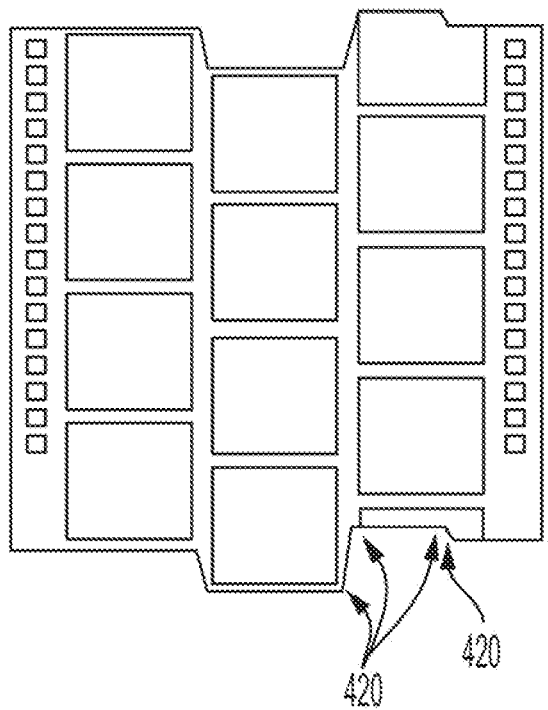
FIG. 4F is an outline of a third separation having the top and bottom edges as defined by one of the cutting paths in FIG. 4C.
Figure 5:
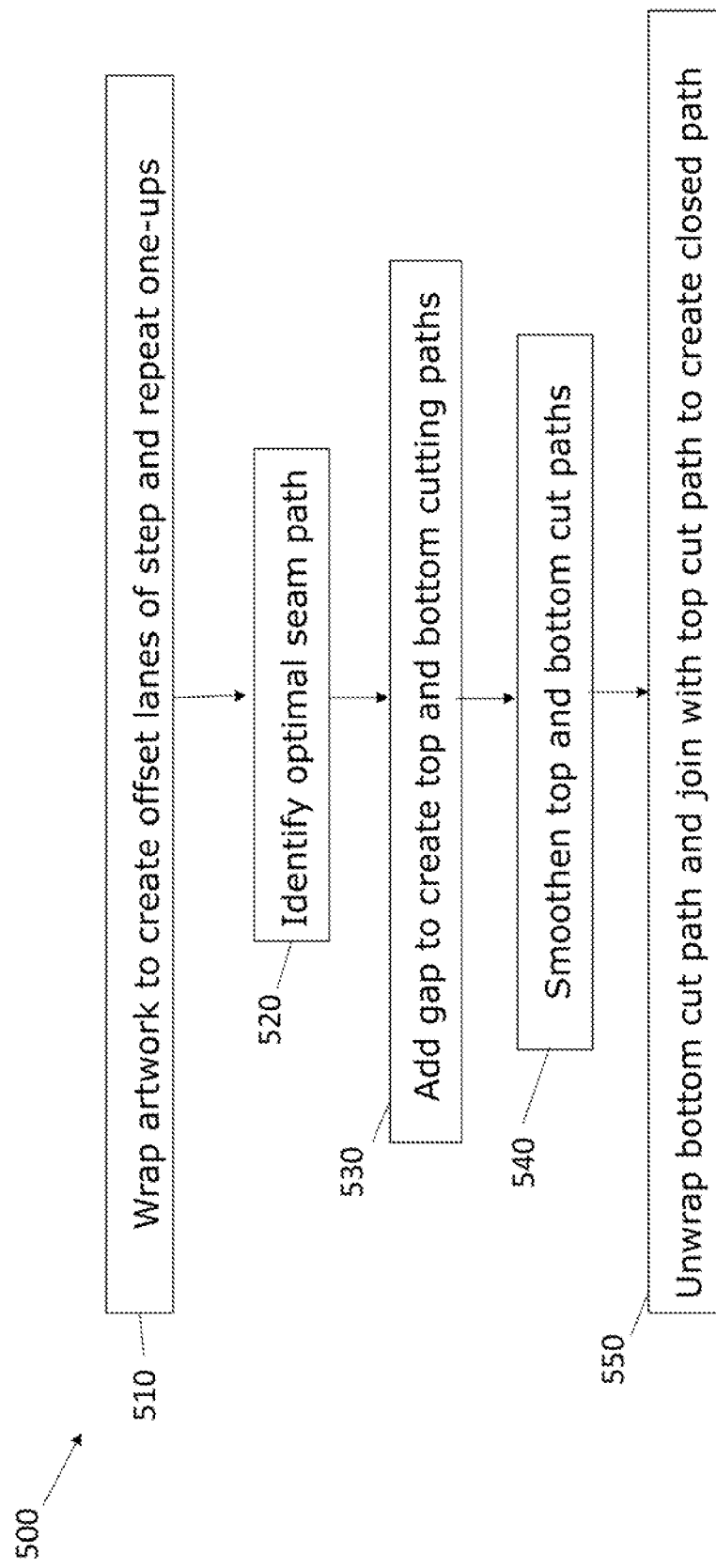
FIG. 5 is a flowchart schematically depicting an exemplary method for designing printing plates with offset lanes in accordance with one aspect of the invention.

The resulting plates are potentially all different, as depicted in FIGS. 4D, 4E, and 4F, and mounting marks (e.g. microdots) 412 are typically used to ensure consistent mounting of the plates on their respective cylinders in register with one another. The remainder of the process as outlined in FIG. 6, by which the plates are imaged, processed, and machine-cut, according to the defined closed plate cutting paths, is then performed as previously described on the updated file so created.

In some instances, the characteristics for the "optimal" path may contradict each other, in which case each characteristic may be weighted or ordered hierarchically by the operator, or in accordance with one or more default hierarchies or weightings, which may be different for different types of operations and may have presets according to the operation type.

Finding an optimal cutting path presents an optimization problem having a plurality of different metrics, including, for example: (a) limiting total amplitude A of the path (vertical spread), to reduce plate waste; (b) limiting the nearness of non-0% (printed) areas to the cutting path, to minimize the risk that the cutting path affects print quality; and (c) limiting the number and severity of inflection points 420 in the cutting path, to reduce the risk of plate damage. These metrics may be contradicting, in which the optimal solution comprises a compromise among them. Therefore, in one embodiment, the processor may prompt and receive a user input specifying the relative importance or weighting of these three metrics, and then use those as weights to evaluate possible solutions. Additionally, including a gap at the seam is helpful for mounting and unmounting purposes, including, for example, making it easier to insert a tool for unmounting the plate from the cylinder and avoiding production (registration) marks may also be considerations.

In one embodiment, the amplitude metric may be approximated by a length metric, using algorithms known in the prior art for identifying length of a line, as it is likely (but not guaranteed) that relatively shorter paths will also have relatively lesser amplitude fluctuation. In another embodiment, discussed in more detail here, a minimal energy-path finding algorithm, such as an energy minimization function, may be used to determine the optimal path, which may not have the shortest path length.

Programming the metrics for defining the seam path includes specifying a desired lengthwise offset spacing Y between respective top boundaries of adjacent complete one-up images (e.g. 404$b$, 404$e$ in adjacent lanes 402$a$, 402$b$). One or more cut-acceptable regions between the lateral edges 307, 308 of each one-up image 404 acceptable for containing a seam path are defined. The definition of such cut acceptable regions may include, for example, identified non-ink-bearing regions that are outside a predefined distance from an ink-bearing feature, or an area within a bleed line, such as the centerline of adjacent die lines. An optimal lateral seam path between the opposite lateral edges of the printing plate is defined, wherein the optimal lateral seam path is defined to travel across each lane only through cut-acceptable regions or through steps between adjacent one-up images, and is based upon seam path criteria including:

minimizing path amplitude;
maximizing distance from cut-unacceptable regions; and
minimizing number of corners having a radius less than a predetermined size.

As discussed in the background section, there are a number of risks associated with cutting through an imaged plate, which risks can be translated into criteria for an optimized cutting path:

1. The cut plate must wrap around the cylinder and contain all artwork that is required on the cylinder surface.
2. The cutting path must stay away from the artwork, at least by a minimal margin, but preferably by a bit more than the minimal margin (a desired margin).
3. The cutting path is ideally smooth, i.e. does not contain (sharp) corners, minimizes the degree and number of inflections.
4. In some embodiments, it is desirable for the gap at the seam to be big enough to facilitate mounting and unmounting (e.g. to insert a tool for unmounting).
5. All production marks should still fulfill their intended purpose. So, for example, cutting through a bearer bar is not disfavored, as even a cut bearer bar will still help with press stability, but cutting through a registration mark is disfavored.

The above criteria often conflict with each other. For example, if the artwork occupies a substantial part of the plate, it may not be possible to stay the minimal distance away from the artwork. In fact, it may even be necessary to cut through the artwork in order to meet the first criterium. Smoothening the cutting path may move the path closer to the artwork. If there is insufficient white space in the design, then the desired gap at the seam might not be achievable without cutting through artwork.

Embodiments of the invention are designed to automatically find an appropriate balance between the foregoing criteria. The methods as described herein are performed using initial input from a user, including the (digital) artwork for which plates need to be made. In some embodiments, the artwork may contain stations that include a die shape. These stations may be staggered. The artwork may also contain production marks or other objects. The initial artwork may be laid out according to one possible cut pattern (not necessarily the one ultimately used). Alternatively, the artwork is already prepared to fit within a rectangle that matches the cylinder area (as is common when producing flexo sleeves or gravure cylinders). The initial input provides the orientation of the artwork relative to the web direction. Additional inputs include dimensions of the cylinder area C for receiving the plate (width $C_w$ and circumference $C_c$); a predetermined minimal distance $D_m$ between cutting paths and the artwork, a desired distance $D_d$ between cutting paths and the artwork, a desired minimum corner radius R for cutting paths, and a desired gap distance G that defines the space between the two ends of the plate when mounted on the cylinder.

Figure 9A:
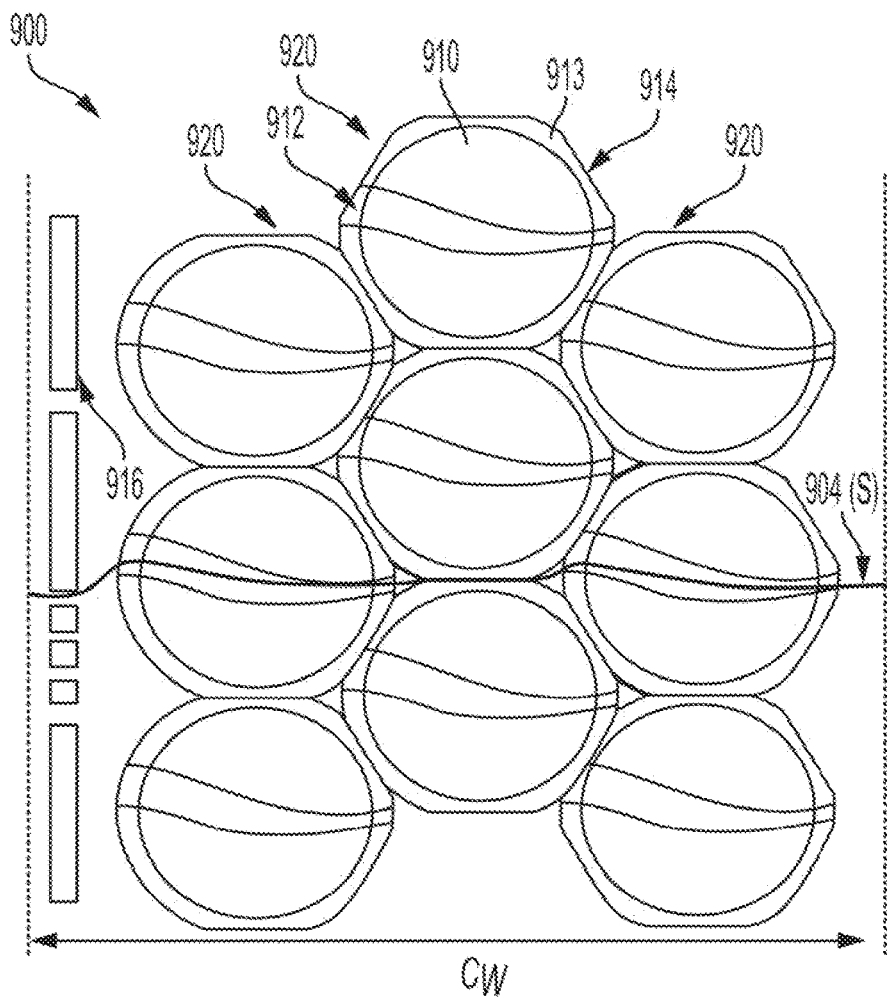
FIG. 9A is an illustration of a layout of artwork comprising stations with die lines and bleed areas, and production marks, showing an exemplary seam path.
Figure 9B:
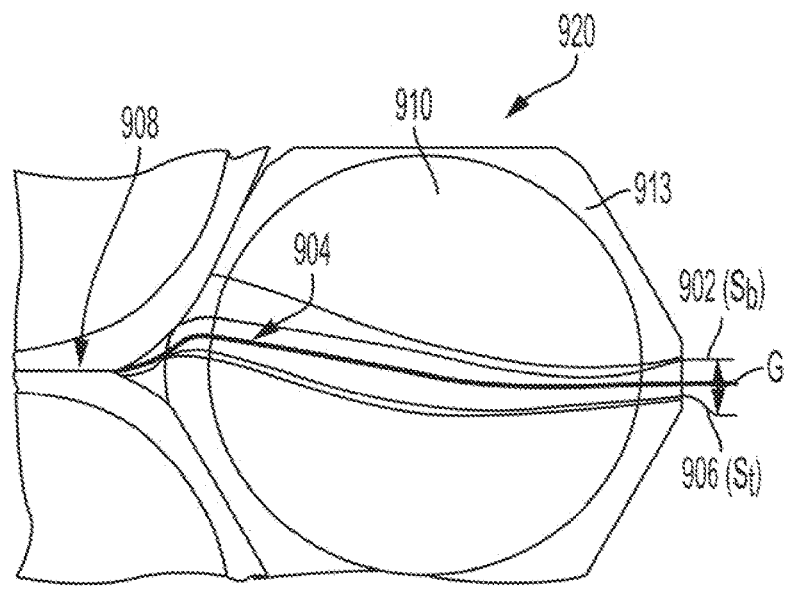
FIG. 9B is an illustration of a highlighted portion of the layout of FIG. 9A, illustrating a variable gap between top and bottom plate edges relative to the cut line.

Thus, in the method as described above with reference to FIG. 5, after performing step 520 to identify the seam path 904 (S) that connects the left and right edges of the cylinder, the gap G is defined in step 530 by offsetting S to create a top cutting path 906 ($S_t$) and a bottom cutting path 902 ($S_b$), as depicted in FIG. 9B, such that the distance between 902 ($S_b$) and 906 ($S_t$) is at most G. While the gap distance between 902 ($S_b$) and 906 ($S_t$) may be variable, the gap G represents the distance between 902 ($S_b$) and 906 ($S_t$). In some regions, the gap distance may be 0 (such as in the corridor 908 between die lines). The plate cutting paths 902 ($S_b$) and 906 ($S_t$) may be permitted to go arbitrarily close to bleed artwork, but may be required to maintain the minimal distance $D_m$ away from the artwork inside the die shape 912. The edges are rounded, where possible, as explained further below.

A preferred algorithm in step 540 now smoothens $S_t$ and $S_b$ (while not exceeding the maximum gap width) so that the curvature K at each point along those paths is at most 1/R (unless that would make $S_t$ or $S_b$ cut through any artwork). Next, the algorithm unwraps $S_b$ by moving it down over the cylinder circumference $C_c$ and join it with $S_t$ to create a closed path. Thus, referring now to FIG. 4C, top path 414$t$, left side path 450, bottom path 414$b$, and right side path 452 create the closed path. This is the resulting cutting path for that separation. Left side path 450 and right side path 452 likewise form closed paths with top path 416$t$, bottom path 416$b$, and with top path 418$t$, bottom path 418$b$, respectively.

We now review each of those steps in more detail. Step 510, comprising preparing the digital graphic file with offset lanes of step and repeat one-ups, may also be referred to as "wrapping." Wrapping is the process in which the artwork is repeated vertically over the cylinder circumference $C_c$ in order to cover the entire cylinder area C ($C_c \times C_w$). FIGS. 9A and 9B illustrate an exemplary layout 900 comprising of a plurality of stations 920 each comprising artwork 910 defined within a die line 912 and a bleed mask 913 defined between a bleed line 914 and the die line 912. Registration marks 916 are located on one side of the layout. Optimal seam path 904 is depicted extending through the artwork in accordance with an algorithm as described in more detail below.

Step 520 automatically finds a path S from one side to the other (e.g. from the left side of C to the right side) of C.

The path is found by solving an optimization problem, such as by applying a minimal energy-path finding algorithm. An exemplary such algorithm is an energy minimization function comprising a proximity metric and one or more curve metrics, such as Equation 1:

$$E(S) = \alpha (\int_{p\ in\ S} P(p) dl) + \beta(L(S)) + \gamma(A(S)) \quad [1]$$

Finding the optimal seam path comprises finding the path for which the energy function of Equation 1 is minimized. The energy function of Equation 1 comprises three terms:

The proximity penalty function P (see below) which is integrated along the path;

The length of the path L(S); and

The amplitude of the path A(S), which is the difference between the maximum and the minimum vertical coordinate of the path.

The relative weight of each of these terms can be chosen by changing the $\alpha$, $\beta$ and $\gamma$ factors. These factors can be assigned in the software, may have preset values for certain applications, or may be offered to the user as a means to control the importance of each requirement (which control may include selecting preset combinations of the factors that are more favorable in certain situations).

Energy terms for other path properties (e.g. smoothness or number of sharp corners, etc.) may also be configured and weighted with corresponding factors.

An Exemplary Proximity Penalty Function

P in Equation 1 is a function that maps each point p on the cylinder to a penalty value, based on the artwork that is to be imaged by the cylinder. A simple proximity penalty function may be based on the distance of the point to the nearest imaged area, as shown in FIG. 7, which includes a graph 750 indicating how the penalty value of a point relates to its distance to the nearest imaged area. FIG. 7 depicts three exemplary points 730, 732, 734 relative to a square-shaped imaged area 700, surrounded by a first area 710 representing the minimal distance $D_m$ from the imaged area, a second area 720 representing the desired distance $D_d$ from the imaged area. Each point relative to the imaged area is then mapped to the graph 750, which depicts penalty P as a function of distance of point p from the imaged area 700. If p lies within an imaged area or is closer than $D_m$ to an imaged area, such as at the location point 730, P(p)=$P_{high}$ (e.g. infinite). If distance from p to the nearest imaged area is >$D_d$, such as at the location of point 734, then P(p)=0. If distance from p to the nearest imaged area is between $D_m$ and $D_d$, P(p) linearly evolves from $P_{medium}$ to 0 along line 752. The invention is not limited to any particular distance-based function, however.

The penalty function can further be refined by dividing the imaged areas into different categories, then defining a partial penalty function for each category (each with different parameters $D_m$, $D_d$, $P_{high}$, $P_{medium}$) and combining them into one penalty function by taking the maximum value among the partial penalty functions. Exemplary categories may include:

Imaged areas within a die-shape. This category may have the highest value for $P_{high}$ (e.g. infinite) and $P_{medium}$.

Imaged areas of the production (e.g. registration) marks (e.g. $D_m$=0, and a lower value for $P_{high}$).

Imaged areas within a bleed area. This may be given the same parameters as for production marks.

More categories may be considered based on types of artwork to create desired hierarchies (e.g. crossing a bearer bar mark may have a lower penalty than crossing a registration mark).

Figure 8:
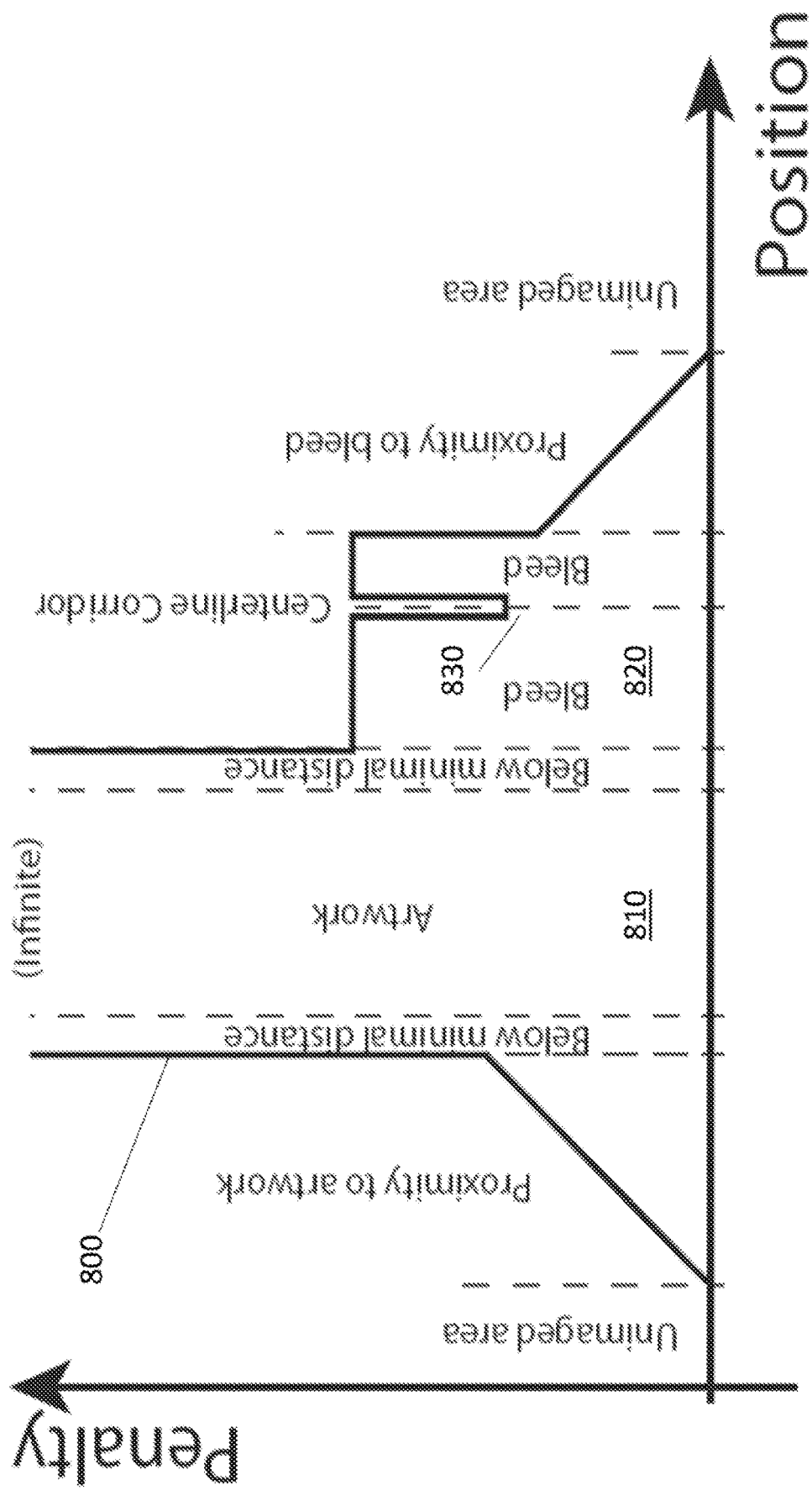
FIG. 8 is an illustration depicting application of a penalty function with different penalties applied inside a die line, in a bleed area, and in a centerline corridor.

The penalty function may further be improved by adding corridors. A corridor is a curve (or narrow tracks) in the function domain where the penalty function is clipped not to go above a threshold value $P_{low}$, despite all the rules described above. This allows the optimization algorithm to find a passage through these corridors that would otherwise have too high a penalty. For example, in one embodiment, corridors may be provided on the centerlines between die-cut shapes, such as line 908 in FIG. 9B. FIG. 8 shows an intersection of an exemplary penalty function 800, with reference to two types of content (artwork 810 and bleed 820), further depicting an intersection of the function with a centerline corridor 830 (such as the corridor 908 depicted between the bleed lines 914 of adjacent stations 920 in FIG. 9B).

Step 530 of identifying the optimal seam path creates two paths 902 ($S_t$) and 906 ($S_b$) on either sides of the seam path 904 (S). Together, $S_t$ and $S_b$ define the gap that the mounted plate will have. The distance between each path $S_t$ and $S_b$ to the seam path S may be variable along its length, and asymmetrical (not the same for $S_t$ and $S_b$).

The distance between $S_t$ and $S_b$ is at most G, but may be as small as zero. As a general rule, neither $S_t$ or $S_b$ should run through imaged areas, unless S itself is also running through that imaged area.

As described above, the seam path S is, and/or each of the top and bottom seam paths $S_t$ and $S_b$ are, smoothened in step 550. An exemplary smoothing algorithm is described in Ju Young Kang and Byung Suk Lee, *Optimisation of pipeline route in the presence of obstacles based on a least cost path algorithm and laplacian smoothing*, Chapter 3, incorporated herein by reference.

The digital graphic file is then updated to define the top edge and bottom edge of the plate in conformance with a geometry of the optimal lateral seam path as defined, and the at least two lanes are filled with the respective pluralities of one-up images or portions thereof between the updated top edge and the updated bottom edge. The method is then performing for each of a plurality of separations corresponding to the digital graphic file.

The step of defining the optimal lateral seam path may comprise defining a plurality of potential lateral seam paths conforming to the seam path criteria within a predetermined degree of deviation, providing a visual display (e.g. on display 1106) illustrating the plurality of potential lateral seam paths, and receiving a user-input (e.g. via input device 1108), such as by the user selecting (e.g. graphically with a mouse click) one of the plurality of potential lateral seam paths as the optimal lateral seam path. In some embodiments, the user may shown one or more points on the artwork for the path to run through, wherein the user selects desired points. The most optimal path is then found within that given user-defined constraint.

Because each separation of a print production job typically has different printed features, the calculated lateral seam paths are often different for each printing plate. In many embodiments this is desirable, as it leads to highly optimal plates for certain applications. (Despite their different shapes, the plates will all align to the intended repeated design after mounting on the cylinder). In other embodiments, however, it may be desirable for the printing plates to share the same shape (as this may be easier for shipping the cut plates). To achieve this, a lateral seam path may be calculated based on the union of all separations, instead of one separation at a time. This option may be included in the plurality of potential lateral seam paths offered to the user.

Figure 10:
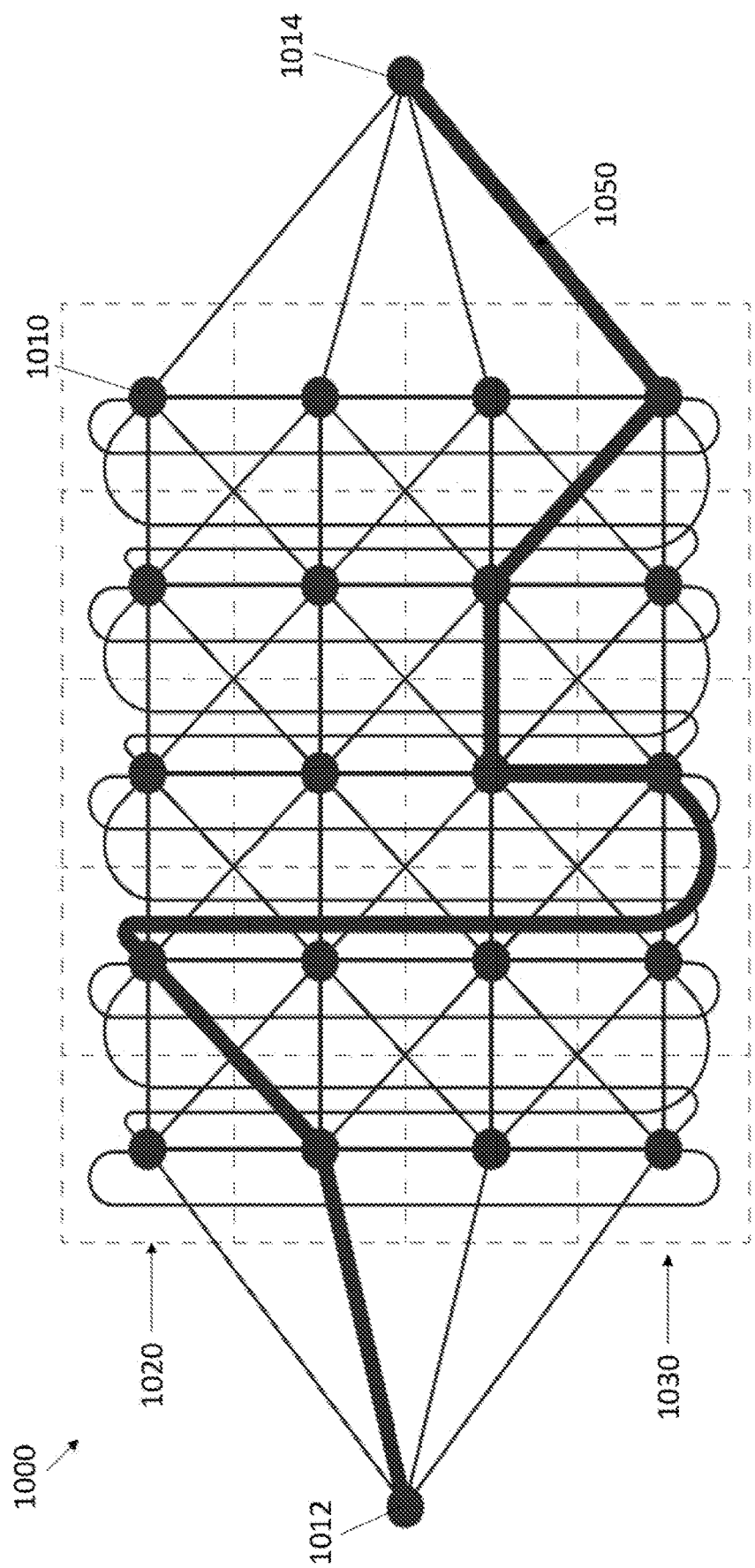
FIG. 10 is an illustration of the application of an energy function to a pixelated version of a penalty function.

In one embodiment, a pixelized version of the proximity penalty function P may be implemented. That embodiment may include the following steps:
1. Calculate a Penalty Image that is the size of the cylinder area, at sufficiently high resolution):
    a. Rasterize the separation to an artwork image (same size and resolution). Use different pixel values to distinguish non-imaged areas from imaged areas (and possibly to distinguish different types of imaged areas).
    b. Evaluate the penalty function for an isolated imaged pixel and store this in a kernel image (sized $2D_d$ by $2D_d$, centred around the imaged pixel). If the penalty function has terms for different artwork categories, then create a separate kernel image for each category.
    c. Initialize the penalty image with all zeros.
    d. For every imaged pixel in the artwork image, align the corresponding kernel image with the penalty image, and store the highest of the two values in the penalty image.
    e. Repeat steps b-d for all imaged pixels.
2. Find the initial cutting path S with the smallest penalty:
    a. Consider the penalty image as a graph 1000, where each pixel is represented by a node 1010 that is connected to its 8 neighbours (horizontally, vertically and diagonally), as depicted in FIG. 10. Two extra nodes 1012, 1014, represent the left and right edge, respectively.
    b. The pixels at the top row 1020 of the image are similarly connected to their bottom row counterparts 1030 (simulating the seamless nature of the cylinder)
    c. Consider the contribution of each edge to the energy function [e.g. Equation 1]:
        i. Contribution to L(S): Length of the edge and
        ii. Contribution to $\int_{p\ in\ s} P(p)\ dl$: length of the edge multiplied by the average of the penalty pixel values at both ends.
    d. Run a path finding algorithm, such as are known in the art, on this graph, finding lowest energy path from left side 1012 to the right side 1014, such as is represented by path 1050 in FIG. 10. The algorithm may be applied left to right or right to left.
    e. Convert this pixel path to a vector path.
3. Perform steps 530 to 550 of the method as described above.

Exemplary path finding algorithms known in the art include algorithms commonly referred to as "Dijkstra" (Dijkstra, E. W. (1959). "A note on two problems in connexion with graphs." *Numerische Mathematik*. 1: 269-271) and extensions thereof, including "A*" [pronounced "A-star"] (Hart, P. E.; Nilsson, N. J.; Raphael, B. (1968). "A Formal Basis for the Heuristic Determination of Minimum Cost Paths". *IEEE Transactions on Systems Science and Cybernetics*. 4 (2): 100-107), incorporated herein by reference.

In some embodiments, the method may omit amplitude (A) of the cutting path from the energy function. In others, step 2(d) may be performed a plurality of times with at least one difference (e.g. applied between at least one different starting node on the left edge, different ending node on the right edge, or forced to include at least one intermediate node, to obtain a predetermined number of results). The plurality of iterations may then be evaluated for P, L, and A to produce different values of E, from which the optimal value for E (typically the lowest value) is ideally selected.

While designs that include a die line may have a corresponding die line associated with them that fixes the stagger pattern of the one-ups, in other embodiments, the stagger pattern may be more variable, allowing an iterative optimization of the cutting paths for different amounts of offset between one-ups in adjacent lanes. In such embodiments, the above method may be performed to select an optimal cutting path for a first stagger pattern, and then performed again for a different stagger pattern. The different stagger pattern may be selected by a human operator, or determined automatically, such as by stepwise incrementing the stagger distance over a range of distances in accordance with a predetermined step distance. The range and step parameters may be provided by user input, or set as a default. The stagger distance has an impact on all of the separations, so the cutting paths for all of the separations may be considered when selecting the optimum stagger pattern.

Although some steps are described herein in a preferred order, the invention is not necessarily limited to any sequence of performance of steps. While, described herein with respect to a specific penalty function and a specific energy function, it should be understood that the invention is not limited to any particular equations for these functions.

Figure 12B:
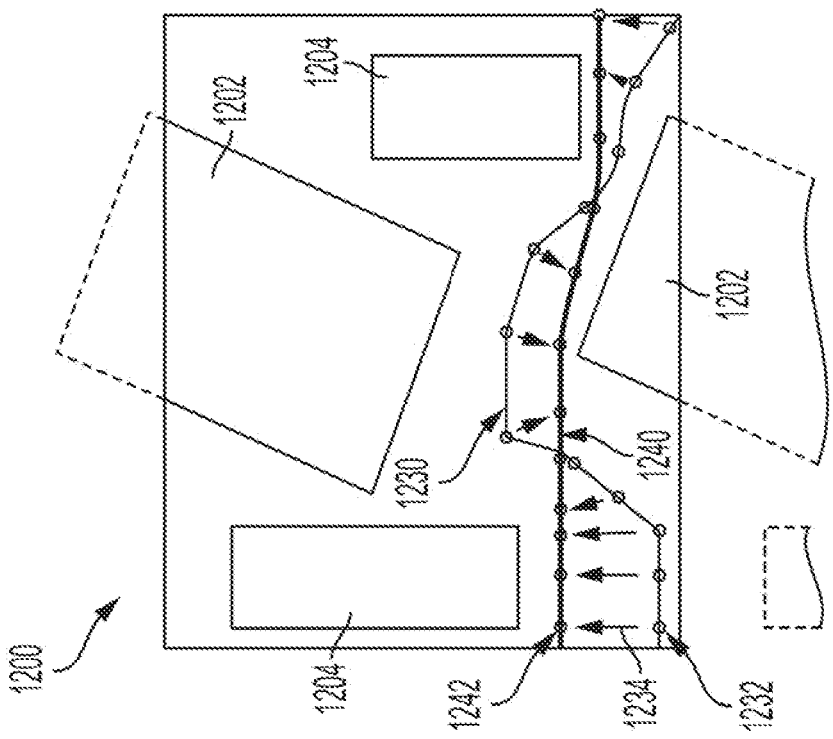
FIG. 12B is an illustration of line smoothing applied to the line derived in FIG. 12A.
Figure 12A:
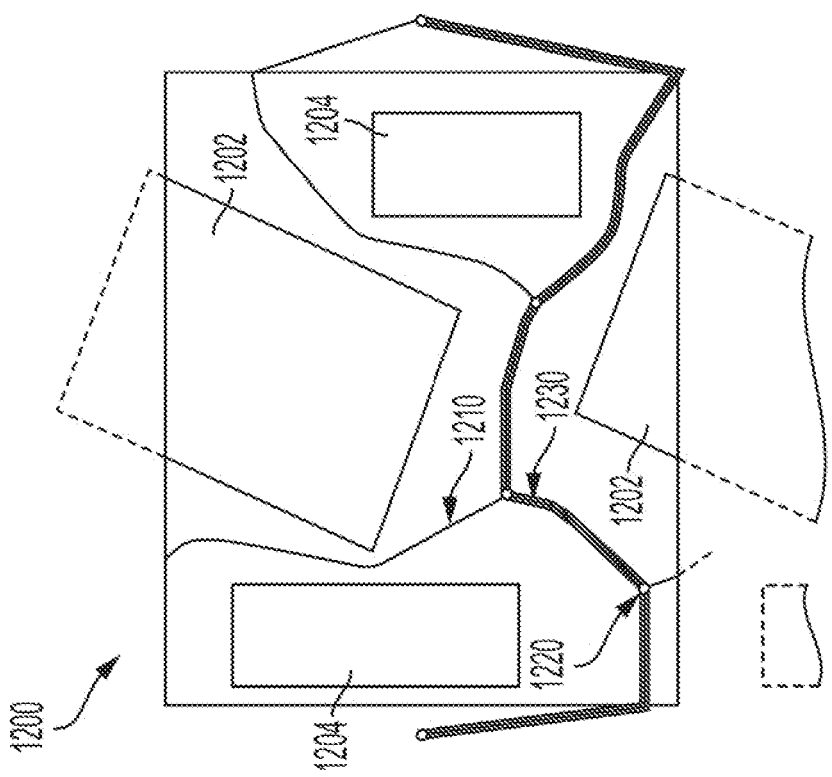
FIG. 12A is an illustration of a portion of a line derived by applying a Voronoi path finding algorithm.

The above embodiment for finding the seam path is one example of a minimal energy-path finding algorithm in which the inked areas are obstacles and path length and proximity are used as energy metrics. Other minimal energy-path finding algorithms, known in the field of path finding and obstacle avoidance may be applied to find paths according to such metrics. For example, in one embodiment, as illustrated in FIG. 12A, a Voronoi diagram may be constructed of the inked areas (obstacles) 1202, 1204 based upon the centerlines 1210 between adjacent obstacles. This diagram is then converted to a graph 1200, in which the graph nodes 1220 are all points where three or more centerlines 1210 meet and where the graph edges represent the centerlines between those nodes. Two nodes are added to represent the left and right side of the plate (not shown), and the graph is simplified by pruning all dead-end subgraphs. The contribution of each edge to the energy of the seam path is calculated, such as by evaluating $E(p)$ along that sub-path. Alternatively, instead of integrating the penalty function, a penalty value may be assigned based on the closest proximity of the sub-path to an inked area. A shortest path algorithm (such as Dijkstra) is then used for finding the lowest energy path 1230 through this graph (from left to right or vice-versa). The path is then post-processed as described herein above to smoothen and straighten (e.g. modify path 1230 to path 1240 by moving nodes 1232 from a first location on path 1230 along arrows 1234 to new locations 1242 on path 1240, as depicted in FIG. 12B), as well as add the gap (as previously described). Smoothening in the Voronoi embodiment may be quite drastic, as the centerlines may be unnecessarily curved. Exemplary algorithms for applying Voronoi diagrams and subsequent smoothing for obstacle-avoiding path finding (for a metric solely based on curve length) can be found in Ho, Yi-Ju and Jing-Sin Liu. "Smoothing Voronoi-based Obstacle-avoiding Path by Length-minimizing Composite Bezier Curve." (2009) (accessible at: https://www.ils.cinica.edu.tw/papers/llu/8846-F.pdf), incorporated herein by reference.

Aspects of the invention as described have advantages over prior art systems in that they may reduce plate waste, result in simpler cutting paths, use less operator time, or a combination of all of the above. While in some cases, utilizing the systems and methods of invention may achieve the same result that might otherwise have been achieved using prior art systems, use of the invention is expected to provide more efficiency, reliability, and repeatability on average, over time.

Although discussed in the context of staggered layouts, the inventive systems and methods are not exclusive to staggered layouts, and aspects of the invention may also be applied on other continuous designs that require non-rectangular plates. When printing on very wide webs, it is also common to produce multiple plates per cylinder, and mount them in lanes. In such embodiments, the invention described herein may also be applied to a single lane, instead of the entire cylinder. Accordingly, references to the "cylinder width" herein with respect to such embodiments refers only to the width of portion of the cylinder covered by a particular lane that extends between the vertical edges of one printing plate.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for designing a printing plate having a plate width defined between lateral edges and a nominal plate length defined between top and bottom edges, the printing plate configured for mounting on a printing cylinder having a cylinder width and a cylinder circumference, the nominal plate length dimension corresponding to the cylinder circumference, the method comprising the steps of:
   (a) preparing an initial digital graphic file comprising artwork;
   (b) defining an optimal lateral seam path between the opposite lateral edges of the printing plate by applying a minimal energy-path finding algorithm comprising an energy minimization function;
   (c) defining a top edge and bottom edge of the plate in conformance with a geometry of the optimal lateral seam path;
   (d) unwrapping the bottom edge from the top edge to define a closed plate cutting path including the top edge, the bottom edge, and opposite side edges connecting the top and bottom edges of the plate, the closed plate cutting path defining an area;
   (e) wrapping the area defined by the closed plate cutting path with artwork or portions thereof; and
   (f) storing an updated digital graphics file.

2. The method of claim 1, wherein the artwork comprises a plurality of production marks and one or more lanes of one-up images or portions thereof are arranged in a step and repeat pattern along the length of the printing plate, the one or more lanes distributed across the width of the plate, each one-up image having a top boundary, a bottom boundary, and opposite lateral edges, each pair of adjacent one-up images in a same lane having a step between each bottom boundary of a first one-up image and an adjacent top boundary of a second one-up image, wherein the optimal lateral seam path is defined to travel across each lane through one or more one-up images, steps between adjacent one-up images, or a combination thereof.

3. The method of claim 2, comprising at least two lanes, wherein the top boundary of a complete topmost one-up image in a first lane is offset from the top boundary of a corresponding complete topmost one-up image in a second lane by a stagger distance.

4. The method of claim 1, comprising defining the top edge and bottom edge to encompass a gap having a gap width equal to or lesser than a maximum gap width on opposite sides of at least portions the optimal lateral seam path.

5. The method of claim 1, further comprising smoothening one or more of the optimal lateral seam path, the top edge, and the bottom edge to minimize a number of inflection points and maximize radius of the inflection points.

6. The method of claim 1, wherein the path-finding algorithm uses a proximity metric and one or more curve metrics.

7. The method of claim 6, wherein the energy minimization function comprises a proximity penalty function P integrated along the lateral seam path.

8. The method of claim 7, wherein the proximity penalty function is configured to assign a highest penalty to proximity within a printed feature of the artwork or to proximity within a minimum distance from the printed feature of the artwork, assign a lowest penalty to proximity beyond a desired distance from the printed feature greater than the minimum distance, and assign a variable penalty to proximity in a range lying between the minimum distance and the desired distance.

9. The method of claim 7, wherein the artwork comprises a die line and a bleed area, and the proximity penalty function is configured to assign a relatively greater penalty to printed features within the die line than within the bleed area.

10. The method of claim 7, wherein the proximity penalty function further includes one or more centerline corridors corresponding to a centerline between die lines, wherein the penalty assigned to the centerline corridor is relatively lower than a penalty that would be assigned based on proximity to the bleed area.

11. The method of claim 7, wherein the proximity penalty function is a pixelized penalty function.

12. The method of claim 1, wherein the energy minimization function includes minimizing overall seam path length as an optimization criteria.

13. The method of claim 12, wherein the energy minimization function includes minimizing seam path amplitude as an optimization criterion.

14. The method of claim 13, wherein the energy minimization function includes weighting factors for weighting the penalty function, the overall seam path length, and seam path amplitude.

15. The method of claim 1, comprising performing steps (b)-(f) for each of a plurality of separations corresponding to the digital graphic file.

16. The method of claim 15, wherein the step of defining the optimal lateral seam path comprises defining a plurality of potential lateral seam paths conforming to the seam path criteria within a predetermined degree of deviation, providing a visual display illustrating the plurality of potential lateral seam paths, and receiving a user-input selecting one of the plurality of potential lateral seam paths as the optimal lateral seam path.

17. The method of claim 16, wherein the plurality of potential lateral seam paths provided in the visual display includes potential lateral seam paths for a plurality of separations, including at least one combination of potential lateral seam paths for the plurality of separations in which the potential lateral seam paths correspond to printing plates for all of the plurality of separations having a same shape.

18. The method of claim 16, comprising providing the initial digital graphic file with a first stagger distance, defining the optimal lateral seam path corresponding to the first stagger distance, considering a second stagger distance different than the first offset, defining a second optimal lateral seam path corresponding to the second stagger distance, and selecting one of the first or second stagger distance for use in perform the remaining steps of the method.

19. The method of claim 1, wherein artwork outside of the closed cutting path is removed in a masking step performed between steps (e) and (f).

20. A process for creating a printing plate, the process comprising the steps of:
(A) designing the printing plate in accordance with the method of claim 1;
(B) imaging the printing plate in accordance with the updated graphics file;
(C) exposing and processing the printing plate;
(D) cutting the printing plate in accordance with the closed cutting path.

21. The process of claim 20, wherein the steps (B)-(D) are performed in the sequence (B), (C), (D).

22. The process of claim 20, wherein step (B) comprises merging a plurality of printing plates onto a merged intermediate plate, and step (D) comprises cutting the merged plate in accordance with the respective closed cutting paths of each of the plurality of printing plates.

23. A method of printing with a printing plate created by the process of claim 20, further comprising the steps of:
disposing the printing plate on a printing cylinder such that the top edge and the bottom edge of the plate lie adjacent one another; and
printing the artwork on a substrate.

24. The method of claim 23, wherein the printing plate disposed on the printing cylinder has a gap between the top edge and the bottom edge in at least one region thereof, further comprising the step of:
removing the printing plate from the printing cylinder using a tool inserted in the gap.

25. A printing plate product made by the process of claim 20.

26. The printing plate of claim 25, wherein the printing plate has a top edge having a first path geometry and a bottom edge having a second path geometry, in which the first path geometry and the second path geometry are not identical.

27. The printing plate of claim 26, wherein the top edge and the bottom edge of the printing plate lie adjacent to one another within a distance ranging from zero to a predefined maximum from one another when disposed in a configuration wrapped around a cylinder.

28. Computer readable media embodying non-transitory computer-readable instructions that when executed by a processor cause the processor to perform the method of claim 1.

29. A printing system including a processor and the computer readable media of claim 28.

30. The printing system of claim 29, further comprising:
an imager configured to receive instructions from the processor for imaging the printing plate in accordance with the updated graphics file;
a cutter configured to receive instructions from the processor for cutting the printing plate in accordance with the closed cutting path.

* * * * *